United States Patent [19]
Nguyen

[11] Patent Number: 6,159,435
[45] Date of Patent: Dec. 12, 2000

[54] LEACHING OF MINERAL ORES

[75] Inventor: Giao Nguyen, Western, Australia

[73] Assignee: Atomaer Pty Ltd, Australia

[21] Appl. No.: 09/297,855

[22] Filed: Jul. 12, 1999

[30] Foreign Application Priority Data

May 6, 1996 [AU] Australia ................ PO 6626
Nov. 6, 1996 [AU] Australia ................ PO 3470

[51] Int. Cl.$^7$ ............. B01F 3/04; C01G 49/06; C22B 3/00; C22B 15/00; C22B 60/02
[52] U.S. Cl. ................. 423/3; 423/18; 423/27; 423/633; 423/20; 423/41
[58] Field of Search ............... 423/3, 18, 27, 423/219, 633, 20, 38, 39, 41

[56] References Cited

U.S. PATENT DOCUMENTS

| | | | |
|---|---|---|---|
| 3,637,371 | 1/1972 | Mackiw et al. | 75/101 |
| 3,642,435 | 2/1972 | Allen et al. | 23/117 |
| 4,568,525 | 2/1986 | Beutier . | |
| 4,674,888 | 6/1987 | Carlson . | |
| 4,676,828 | 6/1987 | Andre . | |
| 5,061,406 | 10/1991 | Cheng . | |
| 5,108,662 | 4/1992 | Litz et al. . | |

FOREIGN PATENT DOCUMENTS

| | | |
|---|---|---|
| 51416/59 | 8/1959 | Australia . |
| 69206/94 | 12/1994 | Australia . |
| 65744/96 | 11/1996 | Australia . |

OTHER PUBLICATIONS

Derwent Abstract Accession No. 85–141570/24, Feb. 13 1985.

Derwent Abstract Accession No. 91–121363/17, Mar. 15, 1991.

Chemical Abstracts, vol. 90 No. 10 issued 1979 Yonsei Univ. Seoul, S. Korea, "Nitrogen Dioxide Catayzled Air Oxidation of Ferrous Ion in Sulfuric Acid Solution", p. 322.

Extractive Mettalurgy, Development Since 1980, Noyes Data Corporation 1984, pp. 19/21.

Journal of Chemical Engineering of Japan, pp. 469–474, vol. 15, No. 6 1982 (Osaka University, Toyonaka), Ogawa, Shinji et al., "Liquid Phase Mixing in the gas–Liquid jet reactor With Liquid jet Ejector".

Derwent Soviet inventions Illustrated, Section I, chemical, Issued Sep. 30, 1975, Chemical Engineering, p. 6, SU 454042, Feb. 11, 1975.

Primary Examiner—Steven P. Griffin
Assistant Examiner—Elin Warn
Attorney, Agent, or Firm—Michael Best & Friedrich LLP

[57] ABSTRACT

A process for oxidation of ferrous ions in solution, and more particularly a process for improved base metal and/or uranium leaching from ores, concentrates or tailings using ferric ion as an oxidizing agent. A reaction vessel (10) holds a ferrous ion-containing solution, for example, a copper sulphide leach slurry or concentrate. An agitator (12) may be provided to promote leaching of the base metal into solution. Some of the ferrous ion-containing solution is drawn off from the reaction vessel (10) and pumped through an in-line mixer (14) via a feed pump (16). Oxygen is injected into the reactor (14) to facilitate oxidation of the ferrous sulphate to form ferric sulphate. The ferric ion-containing solution is then recirculated back to the reaction vessel (10) where the ferric ions are reused in the dissolution of copper sulphide into soluble copper sulphate. The two processes of ferrous oxidation and metal leaching can be conducted either simultaneously or sequentially to effect recovery of copper, other base metals or uranium from ores, concentrates or tailings.

17 Claims, 7 Drawing Sheets

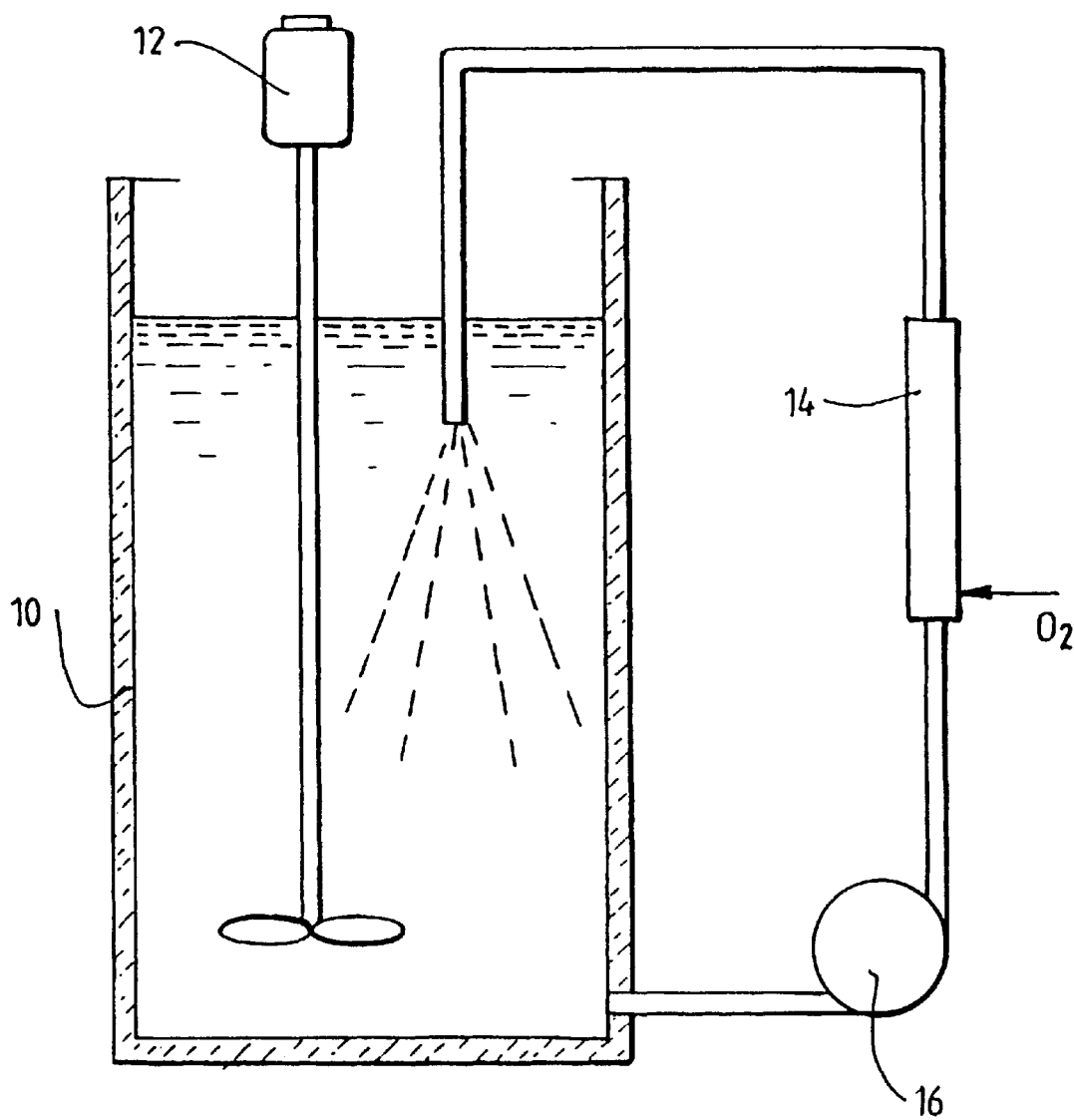
FIG_1.

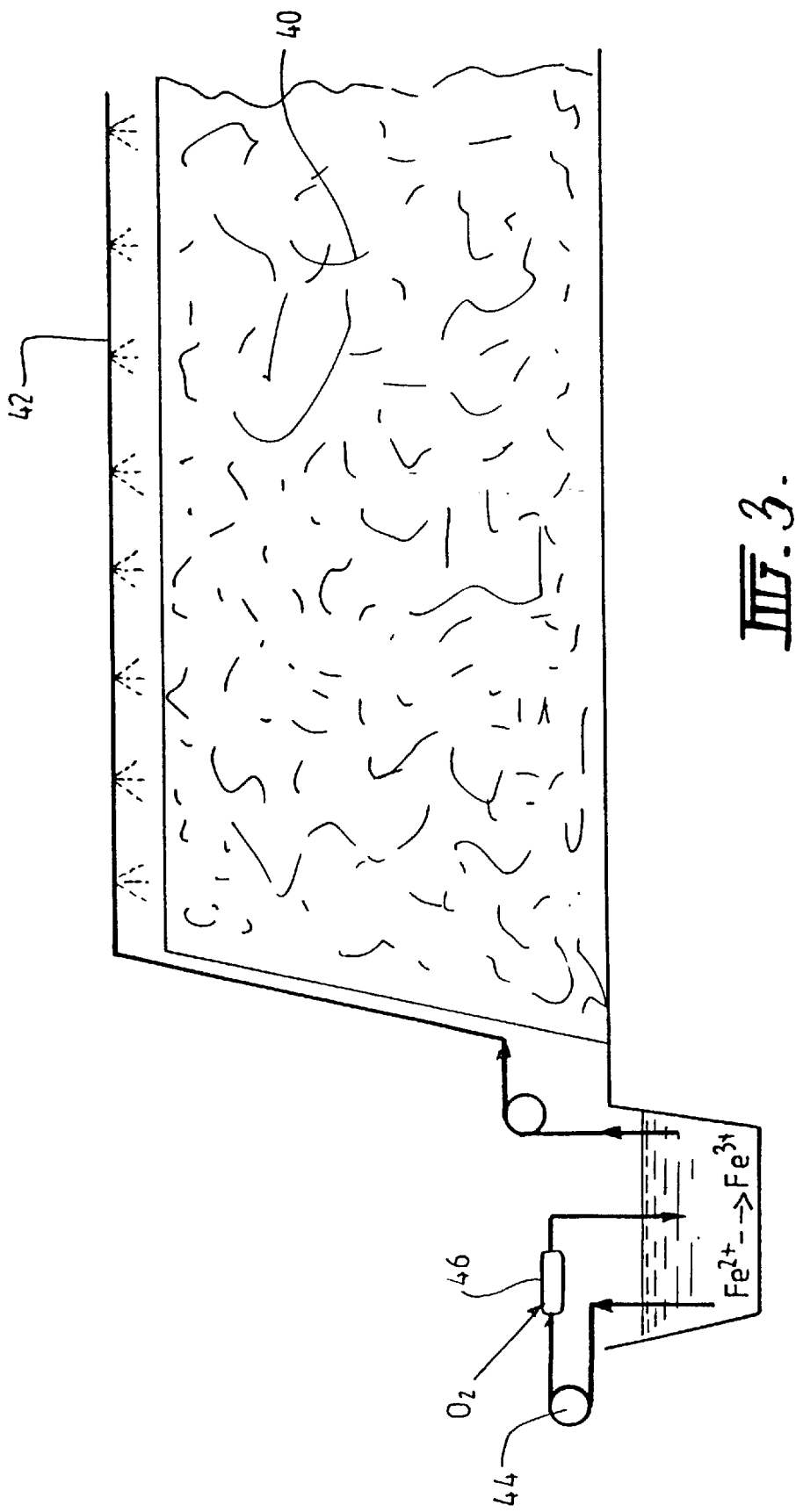

LEACHING OF MINERAL ORES

FIELD OF THE INVENTION

The present invention relates to a process for improved base metal and/or uranium leaching and relates particularly, though not exclusively, to a process involving oxidation of ferrous ions to ferric ions and recirculation of the ferric ions for reuse in the leaching process.

BACKGROUND TO THE INVENTION

It is well known in the mineral processing arts that ferric ion either as ferric sulphate ($Fe_2(SO_4)_3$) or ferric chloride ($FeCl_3$), etc. can be employed for the leaching of copper and other base metals from sulphide ores or concentrate in accordance with the following typical reactions (chalcocite is used as a typical example of copper/base metal sulphides):

$$Cu_2S + Fe_2(SO_4)_3 \rightarrow CuS + CuSO_4 + 2FeSO_4 \quad (a)$$

Chalcocite + Ferric sulphate → Covellite + Copper sulfate + Ferrous Sulphate $$CuS + Fe_2(SO_4)_3 \rightarrow CuSO_4 + 2FeSO_4 + S \quad (b)$$

Covellite + Ferric sulphate → Copper sulfate + Ferrous Sulphate + Sulphur

If ferric chloride is employed, hydrochloric acid will substitute sulphuric acid in reactions (a) and (b) resulting in reactions (c) and (d):

$$Cu_2S + 2FeCl_3 \rightarrow CuS + CuCl_2 + 2FeCl_2 \quad (c)$$

Chalcocite + Ferric Chloride → Covellite + Copper sulfate + Ferrous Sulphate $$CuS + 2FeCl_3 \rightarrow CuCl_2 + 2FeCl_2 + S \quad (d)$$

Covellite + Ferric Chloride → Copper Chloride + Ferrous Chloride + Sulphur

The dissolved copper sulphate can then be recovered by extracting it into an organic solvent such as kerosene with the use of a suitable extractant. This is followed by back extracting the copper into a sulphuric acid solution. The resulting copper containing sulphuric acid solution can then be subjected to an electrowinning process to produce pure cathodic copper metal.

However, hitherto direct use of ferric sulphate for the leaching of copper and base metal sulphides has not been commercially and technically feasible due to:

(i) the high cost of ferric sulphate/ferric chloride that would be required for the dissolution of copper (the stoichiometric requirement is 6.30 tonnes of ferric sulphate per tonne of copper from chalcocite ($CU_2S$)) and (ii) problems due to the presence of an excessive quantity of iron (in either ferric or ferrous state) which would interfere with the solvent extraction/electrowinning process for the purification and production of cathodic copper metal.

In order to make the process commercially and technically feasible, one must be able to effect high copper recovery with the use of a relatively small quantity of ferric sulphate in the leach solution. Once the ferric sulphate is consumed and converted to ferrous state, it must be oxidised back to the ferric state (in accordance with reaction (e)).

$$2FeSO_4 + 0.5O_2 + H_2SO_4 \rightarrow Fe_2(SO_4)_3 + H_2O \quad (e)$$

Ferrous sulphate + Oxygen + sulphuric acid → Ferric Sulphate

However, direct sparging of oxygen containing gases into solution is uneconomic due to low solubility of oxygen in solution resulting in high wastage of oxygen and long residence time. This problem is exacerbated because of the fact that an elevated temperature (eg 80–100° C.) is often required to achieve appreciable ferrous oxidation and copper sulphide dissolution reactions.

Various approaches have therefore been investigated including:

(i) using bacteria such as *thiobacillus ferrioxidant* for the oxidation of ferrous sulphate to ferric sulphate. In fact, without bacterial activities, economic heap leaching of copper sulphide bearing ores would not be feasible;

(ii) using a pressure vessel (autoclave) at an elevated temperature to oxidise ferrous sulphate to ferric sulphate during which time direct oxidation of some sulphide also occurs to a certain extent.

In each case the object is to re-oxidise the ferrous sulphate back to the ferric sulphate state in accordance with reaction (e) in order to reutilise the ferric ion for the copper leaching duty (reactions (a) and (b)) without the need for excessive supply of ferric sulphate into the leach slurry.

In such operations, oxygen essentially plays the role of an oxidising agent whilst the ferric ion acts as an electron carrier for the copper sulphide oxidation process.

However, a major disadvantage with bacterial oxidation of ferrous ion is that it is very slow and normally takes many days to perform the task. It has therefore been found only suitable for heap leaching practice when the leaching time can be as long as 12 months or more. On the other hand, although pressure oxidation requires shorter residence time (in the order of a few hours) it incurs a high capital investment and high operating costs.

Ferric ion is also useful for the leaching of uranium from uranium ores due to its high oxidative property. In general, uranium occurs in nature as oxides in different oxidation states: $U^{6+}$, $U^{5+}$, $U^{4+}$ and $U^{3+}$. Whilst $U^{6+}$ is readily soluble in sulphuric acid, other forms of uranium minerals are either sparingly soluble or not soluble at all.

In order to solubilize the uranium bearing minerals, it is essential to oxidise them to the $U^{6+}$ state with the use of an oxidising agent such as hydrogen peroxide, sodium peroxide, or ferric ion in accordance to reaction (g). Direct oxidation of uraninite by oxygen in aqueous medium is normally not feasible.

$$UO_2 + 2FE^{3+} \rightarrow UO_2^{2+} + 2Fe^{2+} \quad (g)$$

As in the case of copper leaching, the use of ferric ion has not been commercially feasible, even though uranium is more valuable than copper (currently around $40/kg of yellow cake), due to the lack of an economic process for production/regeneration of ferric ion in leach solutions.

Existing industry practices include the use of either hydrogen peroxide, nitric acid, sodium peroxide or sodium chlorate. All of these chemical reagents are expensive and apart from hydrogen peroxide, the by-products are generally environmental unfriendly and hazardous to handle. Substituting these chemical reagents with a less expensive reagent, such as oxygen, would provide a very attractive alternative processing route.

SUMMARY OF THE INVENTION

The present invention was developed with a view to providing a more efficient process for oxidising ferrous ion back to ferric ion so that it can be reused in the leaching of base metals and/or uranium.

According to one aspect of the present invention there is provided a process for oxidation of ferrous ions in solution, the process comprising:

forcing the ferrous ion-containing solution through an in-line mixer under the influence of a controlled pressure differential between an inlet and an outlet of the mixer; and injecting oxygen or an oxygen-containing chemical reagent into the in-line mixer to facilitate oxidation of said ferrous ions ($Fe^{2+}$) to form ferric ions ($Fe^{3+}$).

According to another aspect of the present invention there is provided a process for improved base metal and/or uranium leaching from ores, concentrates or tailings using ferric ion as an oxidising agent, the process comprising the steps of:

dissolution of an insoluble base metal compound or uranium into a soluble metal compound in a leach slurry or solution by chemical oxidation with ferric ions ($Fe^{3+}$) so as to produce a byproduct ferrous ion ($Fe^{2+}$);

recovering the base metal or uranium by extracting the soluble metal compound and subjecting it to a suitable winning process;

recirculating the leach slurry or solution with the byproduct ferrous ion through an in-line mixer; and, converting the ferrous ion back to ferric ion by oxidation, wherein said oxidation is facilitated by injecting oxygen or an oxygen-containing chemical reagent into the in-line mixer.

Preferably said in-line mixer is a static reactor operated so as to subject the leach slurry or solution to elevated pressures and/or high shear whilst injecting said oxygen or oxygen-containing chemical reagent.

BRIEF DESCRIPTION OF THE DRAWINGS

In order to facilitate a more comprehensive understanding of the nature of the invention, preferred embodiments of the process in accordance with the invention will now be described in detail, by way of example only, with reference to the accompanying drawings, in which:

FIG. 1 is a schematic diagram of a possible embodiment of the process for ferrous oxidation and recirculation in a base metal leaching process;

FIG. 3 is a schematic diagram of an embodiment of a typical base metal/uranium heap leaching process utilising the process of ferrous oxidation and recirculation in accordance with the present invention;

DETAILED DESCRIPTION OF PREFERRED EMBODIMENTS

Figure 2A:
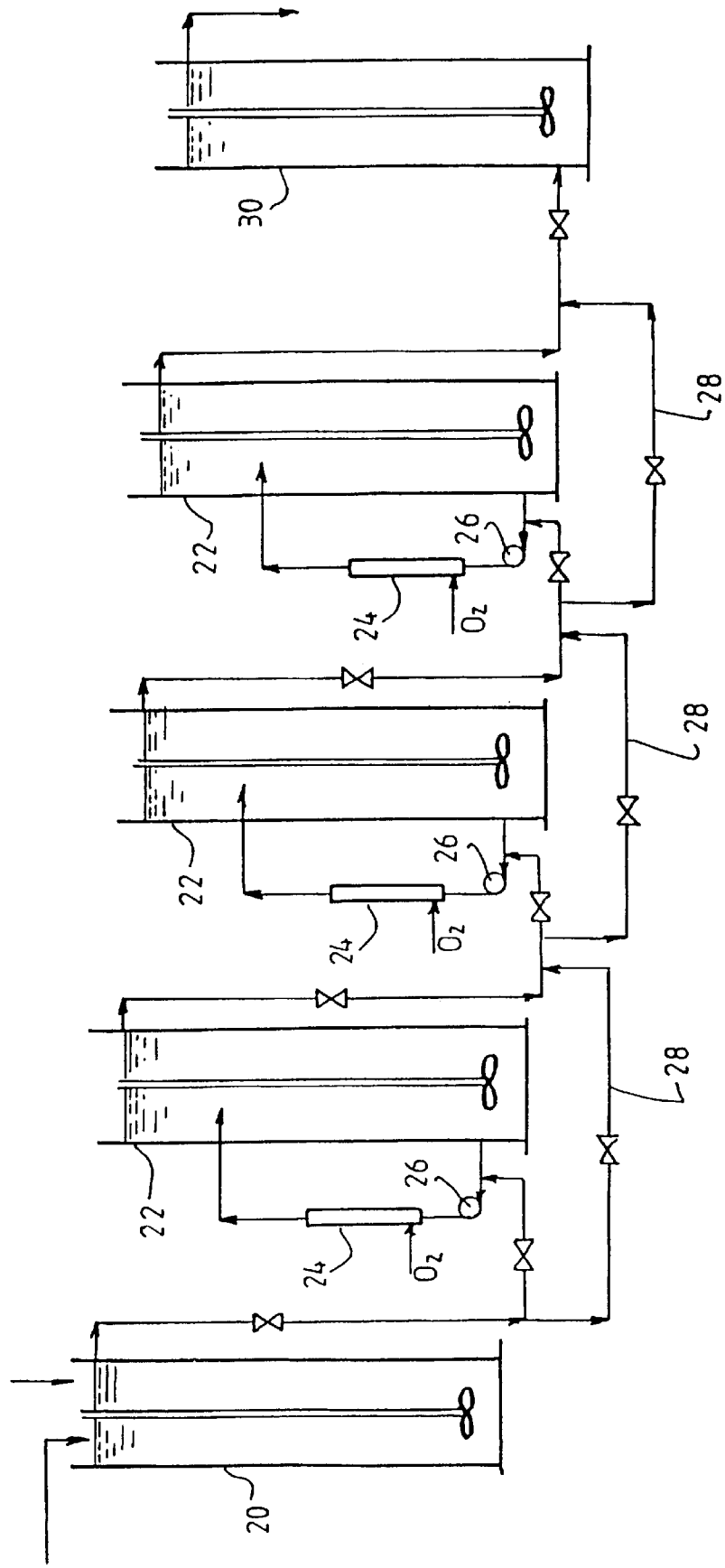
FIGS. 2(a), 2(b) and 2(c) illustrate schematically three alternative embodiments for a typical base metal/uranium leaching installation utilising the process of ferrous oxidation and recirculation in accordance with the present invention.

The present invention is based on the discovery by the inventors that continuous ferrous to ferric ion conversion and copper/uranium leaching can be facilitated by recirculating a ferrous ion-containing leach slurry or a ferrous ion-containing leach solution through a pressurised in-line mixer which is injected with oxygen or an oxygen-containing chemical reagent gas. In the following described embodiments the in-line mixer employed is a static reactor, such as the Applicant's FILBLAST™ Gas Shear Reactor (GSR), which is operated so as to subject the leach slurry or solution to elevated pressures and/or high shear whilst injecting the oxygen or oxygen-containing chemical reagent gas. The FILBLAST GSR is itself the subject of Australian Patent Application No. 69206/94, the contents of which are incorporated herein by reference. However, it is to be understood that any suitable in-line mixer may be employed which allows the injection of oxygen or an oxygen-containing chemical reagent into the mixer to facilitate oxidation of $Fe^{2+}$ ions to $Fe^{3+}$ ions under the influence of a controlled pressure differential between the inlet and the outlet of the mixer. FIG. 1 illustrates schematically one possible embodiment of the process for ferrous to ferric conversion in accordance with the invention.

In FIG. 1 a reaction vessel 10 holds a ferrous ion-containing solution, for example, a copper sulphide leach slurry or concentrate. Optionally, an agitator 12 may be provided to promote leaching of the base metal into solution. Some of the ferrous ion containing solution is drawn off from the reaction vessel 10 and pumped through an in-line mixer, in this case a FILBLAST reactor 14 via a feed pump 16. In this embodiment, pure oxygen is injected into the FILBLAST reactor 14 to facilitate oxidation of the ferrous sulphate to form ferric sulphate in accordance with reaction (e) noted above. The ferric ion-containing solution is then recirculated back to the reaction vessel 10 where the ferric ions are reused in the dissolution of the copper sulphide into soluble copper sulphate in accordance with reactions (a) and (b) noted above. That is, the FILBLAST™ reactor 14 provides the means for saturating the liquor/slurry with oxygen, while the reactor vessel 10 provides the residence time for the oxygen/ferrous to ferric reaction to occur.

The two processes of ferrous oxidation and metal leaching can be conducted either simultaneously or sequentially to effect recovery of copper, other base metals or uranium from ores, concentrates or tailings. Simultaneous ferrous oxidation and metal leaching is suitable for leaching of feed materials which contain high concentrations of valuable metals and low concentration of soluble metal ion. On the other hand, sequential operation (ferrous oxidation followed by metal leaching) is a preferred option for leaching of feed materials which contain low concentrations of valuable metals and high concentration of soluble metal ion.

The leach slurry or solution in reaction vessel 10 is treated at atmospheric pressure whereas the ferrous ion-containing slurry or solution is forced through the in-line mixer 14 under the influence of a controlled pressure differential between the liquid inlet and outlet of the mixer. This pressure differential is generated by feed pump 16, and in the experimental installation pressures in the range of 400–950 kPa gauge were applied. However the required pressure will vary depending on the nature of the ore, concentrate or tailings to be leached, and the desired leaching time. The rate of ferrous to ferric conversion is increased with an increase in solution temperature. Generally temperatures between 50–95° C. have been found sufficient for ferrous oxidation and leaching of copper from some ores and tailings.

The rate of ferrous oxidation increases with decrease in acid concentration and the oxidation is most favourable at sulphuric concentrations below 1N (or 49 g/L). However it was observed that at sulphuric acid concentrations below 10 g/l, precipitation of jarosite occurred resulting in significant loss of ferric sulphate. Since the precipitation of jarosite is irreversible, initial sulphuric acid concentration of less than 30 g/L is preferably avoided particularly when the ferrous concentration is higher than 30 g/L in order to make sufficient allowance for the acid consumption during ferrous oxidation [reaction (a)].

For example, if the ferrous sulphate solution contained 40 g/L of ferrous ion and the initial acid concentration was 30 g/L, a 60% ferrous oxidation would consume 21 g/L of sulphuric acid resulting in the final acid concentration of 9 g/L, the threshold below which precipitation of jarosite occurs. Therefore the most preferred range of acid concentration is between 30–50 g/L. The lower end of such a range corresponds to low ferrous concentration (20 g/L) and the higher end would be suitable for high ferrous concentration (40–50 g/L).

Alternatively, the acid content of the solution should be continuously controlled at 20–30 g/L in order to maximise ferrous oxidation without the danger of jarosite formation. However controlled acid addition by direct pH reading from the hot solution can be unreliable. This can be overcome by cooling a small stream of the solution where the pH is continuously measured for a proportionally controlled acid addition.

Because the ferrous sulphate is continuously re-oxidised to the ferric state, which is simultaneously or sequentially employed in the copper leaching process, there is no need for the addition of excessive quantities of ferrous or ferric sulphate into the leach slurry or solution. A very moderate requirement of approximately 20–50 g/L $Fe^{2+}$ has been found sufficient for near complete dissolution of copper sulphides in ores/concentrates. The $Fe^{2+}$ ion can be added in any of the following forms:

I. Ferrous sulphate in either a hydrated or non-hydrated state

II. Ferric sulphate (in either a hydrated or non-hydrated state) which would be reduced to ferrous sulphate upon reaction with copper sulphide (reactions (a) & (b))

III. Ferrous or ferric chloride in either hydrated or non-hydrated state

IV. Iron sulphides such as pyrite ($FeS_2$) or pyrrhotite (FeS) or chalcopyrite ($CuFeS_2$), etc. which are often present naturally in copper sulphide ores/concentrates and would react with oxygen and sulphuric acid to form ferrous sulphate (or hydrochloric acid to form ferrous chloride)

V. Metallic iron which would dissolve in acid to form ferrous and/or ferric ions VI. Any other iron containing chemical compounds or minerals that release ferrous or ferric ions in the leach solution.

Since most copper/base metal sulphide ores, concentrates and tailings normally contain certain quantities of partially soluble iron bearing minerals such as pyrite ($FeS_2$) and pyrrhotite (FeS), addition of ferrous compounds is not always required.

Any suitable oxygen-containing chemical reagent may be injected into the in-line mixer to effect the ferrous to ferric conversion. However, since oxygen is probably the least expensive and the most environmentally friendly oxidising chemical reagent, its use as the reagent would undoubtedly attract the greatest interest amongst mining companies. Only 0.14 kg of oxygen is required to oxidise 1 Kg of ferrous ion or 2.71 Kg of ferrous sulphate. As a result, the stoichiometric requirement of oxygen is about 1 kg for the dissolution of 5 Kg of chalcocite (which contains 3.97 Kg of copper). Assuming an oxygen utilisation rate of 80%, only 0.32 Kg of oxygen would be required to extract 1 Kg of copper from chalcocite. Currently the cost of oxygen is in the proximity of $0.10 to $0.18/kg, depending on whether it is generated on site or is purchased as liquefied oxygen, and depending on power, transport costs, etc. Therefore the potential cost savings of the process are enormous as the cost of oxygen consumption would amount to only 3.2 to 5.8 cents per kilogram of copper, which is currently worth around $2.5/kg.

To achieve effective ferrous oxidation and base metal recovery with maximum oxygen utilisation and minimal short circuiting, a multiple stage installation such as that illustrated in FIG. 2 would preferably be employed. The same installation and operating conditions have also been found to be effective for recovery of uranium from ores, concentrates or tailings. FIG. 2(a) illustrates schematically a typical multiple stage installation for base metal/uranium leaching which employs simple in-line mixers to effect recirculation and ferrous oxidation.

The leach solution is made up in surge tank 20 by the addition of ferric sulphate and sulphuric acid to the ore slurry. The slurry/liquor from surge tank 20 is then fed into the recirculation circuit of an adjacent reaction vessel 22. Reaction vessel 22 is provided with a simple in-line mixer 24, in this case a FILBLAST GSR, through which the ferrous sulphate-containing solution from reaction vessel 22 and surge tank 20 is forced by a feed pump 26. The overflow from reaction vessel 22 can be fed into the recirculation circuit of a substantially identical stage in the installation cascade. Bypass lines 28 allow one or more stages in the cascade to be bypassed if desired. The number of stages will vary depending on the characteristics of the ore/concentrate/tailings. The overflow from the final stage is fed into a collector tank 30 which discharges to a filter/thickener for recovery of the dissolved base metal or uranium. The collector tank allows completion of the leaching reaction without the addition of further oxygen, thereby resulting in a reduction of the ferric ion concentrate. This is of benefit when the next step following solid/liquid separation is solvent extraction/electrowinning.

Figure 2B:
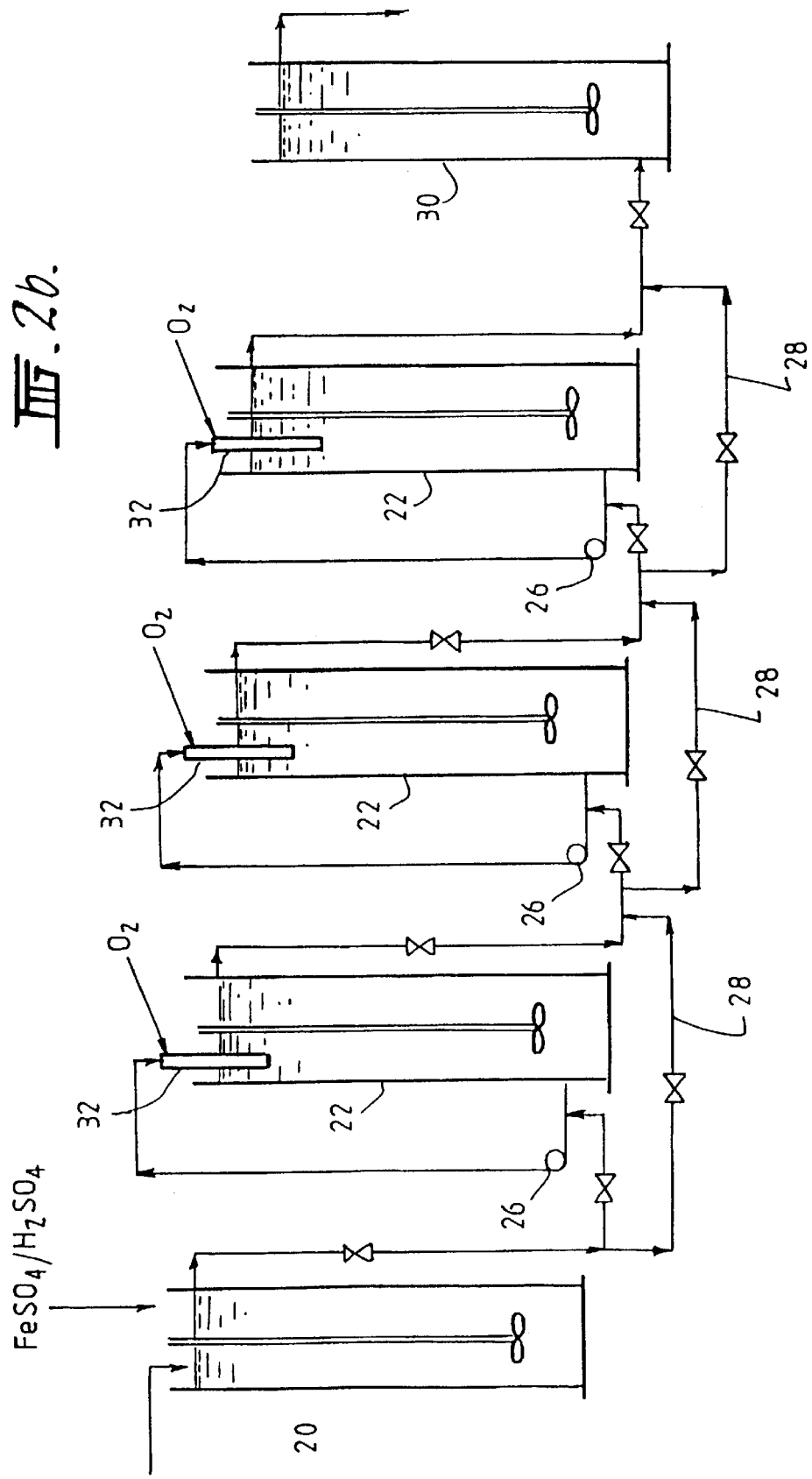

FIG. 2(b) illustrates an alternative embodiment of a multistage installation in accordance with the present invention, in which the in-line FILBLAST GSR 24 in the recirculation circuit of each stage is replaced with a partly or fully submerged in-line mixer 32. Oxygen or a suitable oxygen containing reagent is injected into the in-line mixer 32 to facilitate oxidation of the ferrous sulphate (and copper sulphate) under elevated pressures and/or high shear conditions. The in-line mixer 32 may be any suitable static mixer.

Figure 2C:
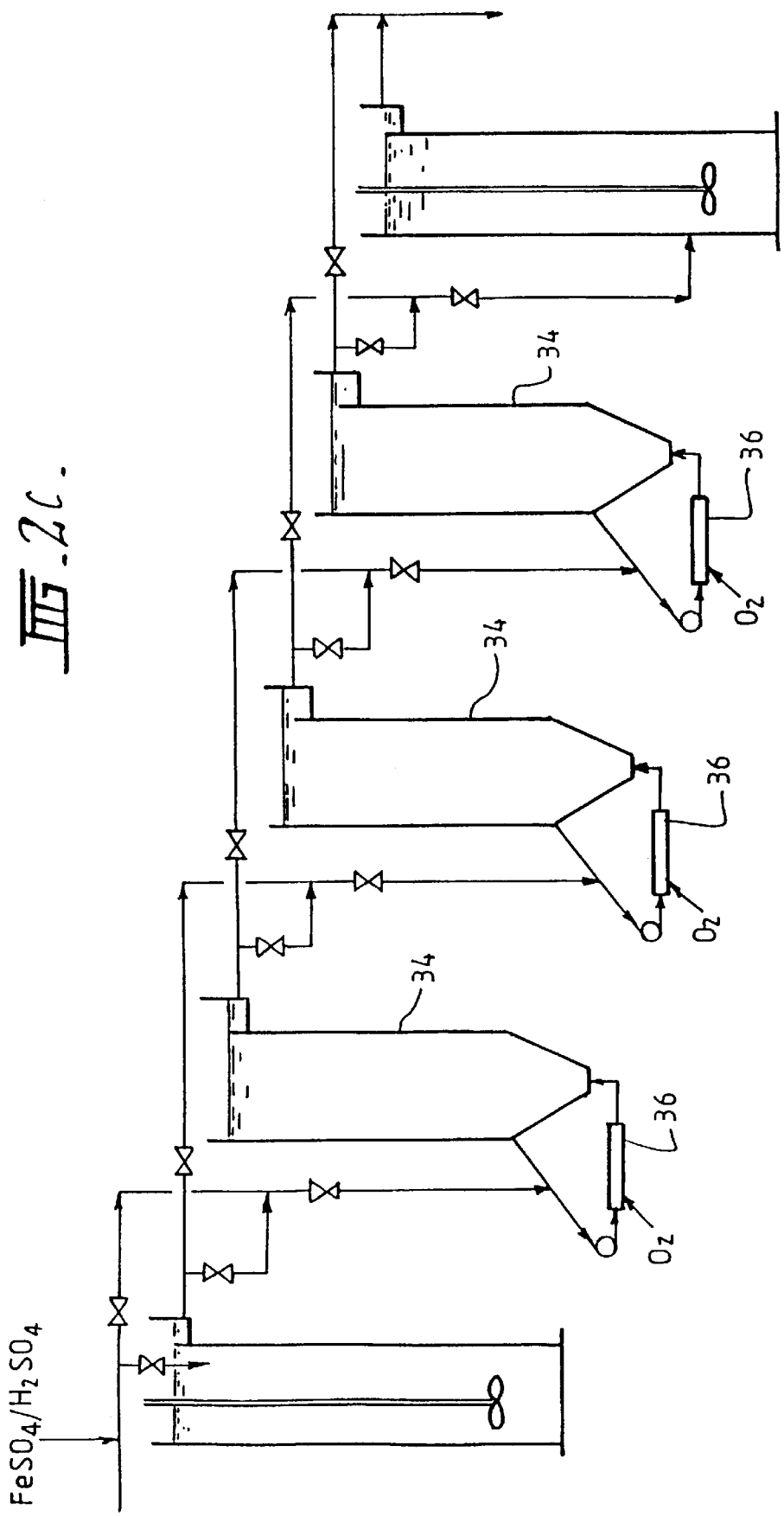

FIG. 2(c) illustrates a still further embodiment of a base metal/uranium leaching process which incorporates ferrous to ferric conversion in accordance with the present invention. In this embodiment, the reaction vessels 22 are replaced with Pachuca tanks 34 which are each provided with a recirculation circuit similar to the embodiment of FIG. 2(a). A simple in-line mixer 36 provided in each recirculation circuit may be a FILBLAST GSR or other suitable static mixer.

The ferrous to ferric conversion process of the present invention is also applicable to a base metal/uranium heap leaching process. A schematic diagram of a possible embodiment of a heap leaching process is illustrated in FIG. 3. A heap of ore 40, such as in a tailings dump at a mine site, may be subjected to leaching by a reticulation system 42. The leaching solution with mineral values and ferrous ions contained therein is collected and subjected to the ferrous to ferric conversion process in accordance with the invention in a similar manner to that described in relation to FIG. 1. The ferrous ion-containing solution is forced by a recirculating pump 44 through an in-line mixer 46 which is injected with an oxygen containing chemical reagent to facilitate oxidation of the ferrous ions ($Fe^{2+}$) to form ferric ions ($Fe^{3+}$).

In order to further illustrate the present invention the following examples are given for illustrative purposes only, and are not to be taken as limiting the process according to the invention in any way.

EXAMPLE 1

Table 1 below summarises the typical chemical and physical properties of a plant solution tested for ferrous/ferric conversion in accordance with the present invention.

TABLE 1

| Analysis | Values | Unit |
|---|---|---|
| Cu | 1,577. | ppm |
| Co | 7.1 | ppm |
| Fe (mainly $Fe^{2+}$) | 20–22 | g/L |
| $Cl^-$ | 1.75 | g/L |
| Free Acid (as $H_2SO_4$) | 28 to 48 | g/L |
| $SO_4^{2-}$ | 65.5 | g/L |
| pH | 1.08 | |
| SG | 1.10 | |
| Temperature | 50–60 | °C. |

It was found that at solution temperatures within the range 80–95° C. a ferrous (ion) conversion rate of approximately 30–40 g/L was recorded during the first 10–15 minutes, but this rate decreased as the reaction proceeded towards equilibrium. This slowing of the reaction occurs because the reaction rate is second order to ferrous concentration (proportional to $[Fe^{2+}]^2$). After 90 minutes, up to 70% conversion of the total ferrous concentrations had been achieved. Under conditions of simultaneous ferrous oxidation and copper leaching, the ferric ion is consumed by the oxidation process soon after it forms and higher reaction rates are expected in practice.

EXAMPLE 2

Leaching of copper and uranium from a flotation tailing sample was conducted using oxidised concentrate leach thickener overflow in lieu of sodium chlorate. The laboratory test results (conducted in stirred beaker), as tabulated in Table 2, indicate that uranium and copper can be effectively dissolved to equivalent plant level by using the oxidised ferrous sulphate solution. This is in despite of the fact that the ferric content of the thickener overflow was significantly lower then the equivalent value required to wholly substitute the total quantity of sodium chlorate currently employed. This can be explained by the fact that although appreciable sodium chlorate was added, the concentration of ferric iron in the plant leaching circuit seldom exceed 1–2 g/L, similar to what was found in the final laboratory leach solution. It is thought the ferric iron formed by sodium chlorate addition has been largely consumed by the formation of jarosite due to localised high oxidation potential at the point of chlorate addition.

Appreciable improvement in uranium dissolution can be achieved with the FILBLAST leach process. The results as tabulated in Table 2 indicate that in general the FILBLAST leach process resulted in better copper and uranium recovery. This was evident by comparison of the FILBLAST leach residue with those of laboratory leach and plant leach. On average dissolution of an additional 1 Kg/t of copper and 100 g/t of uranium have been achieved by the FILBLAST leach process.

TABLE 2

| PROCESS | AVERAGE Cu (Kg/t) | AVERAGE U308 (g/t) |
|---|---|---|
| Unleached | 4.1 | 823 |
| Plant Leach | 3.3 | 204 |
| Lab Leach (with $Fe^{3+}$) | 2.1 | 222 |
| Filblast leach (with $Fe^{3+}$) | 1.6 | 128 |

High dissolution of the valuable minerals may be explained by the following factors:
  Maintenance of high ferric concentration throughout the FILBLAST leach. Ferric sulphate reduced by the uranium and copper sulphide was effectively regenerated by the FILBLAST leach process.
  High shearing effect on the mineral particles,
  High mixing intensity of the FILBLAST process.

However, there was an adverse effect of the FILBLAST leach process in regard to the level of silica in the leach solution. The silica concentration in the FILBLAST leach solution consistently ranged from 7–10 g/L which was twice those found in the plant and laboratory leach liquors. It was not possible to determine accurately the actual concentration in the leach liquors because filtration necessary for liquor analysis might have removed a certain quantity of the silica that was larger than the 8 μm pore size of the filter paper. Such a high silica level exceeds the limit preferred by plant operators particularly in regard to the solvent extraction stage. The problem was exacerbated by the fact that the dissolved silica appeared to be well polymerised into colloidal form that cause emulsification of the leach pulp. This would be likely to result in difficult solids—liquid separation process. It is thought that high shear rate is the main reason for such an excessive dissolution and polymerisation of silica.

Another test was conducted to investigate the effect of shear reduction by leaching at low pulp density. The flotation tailing's pulp density was reduced to approximately 20% solids by dilution with process water prior to a FILBLAST leaching experiment. The results as tabulated in Table 3 indicate that excessive silica concentration was still observed. However, the pulp viscosity did not seem to be greatly affected and the resulting pulp settled down as readily as the unleached pulp.

TABLE 3

| LEACH TIME (H) | Cu GRADE (kg/t) | U308 GRADE (g/t) |
|---|---|---|
| 0 | 22.1 | 759 |
| 2 | 11.1 | 130 |

It is significant to note that the uranium concentration in the low pulp density leach residue was found to be quite low (130 g/t) although a residence time of only 2 hours was employed. While such a single test may not be sufficient to provide conclusive results, it is quite probable that low pulp density leach would result in improved uranium recovery. Such a high uranium recovery could be accounted for by a better diffusion of ferric ions toward the uranium bearing mineral particles.

EXAMPLE 3

Figure 4:
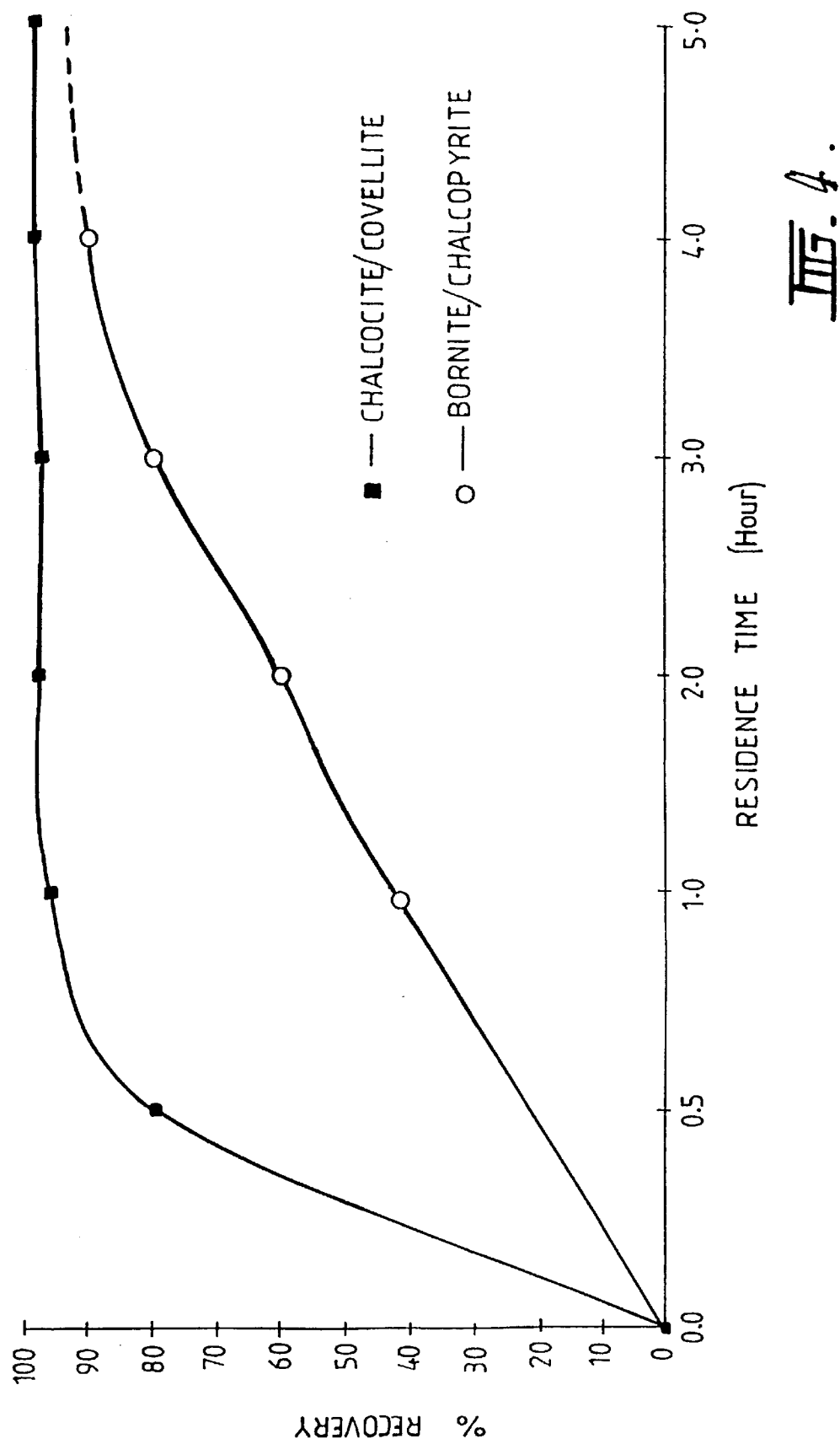
FIG. 4 is a graph illustrating % recovery of copper from a concentrate sample (51% Cu) during a pilot leaching test; and, FIG. 5 is a flowsheet illustrating a possible process for recovery of copper from sulphides which incorporates a preferred leaching process utilizing recirculation of ferrous ion and oxidation in accordance with the present invention.

Exploratory tests have been conducted using a chalcocite filter cake sample with particle size P80=53 μm, taken from a flotation plant. The tests were conducted in the temperature range of 85–90° C. A pulp density of approximately 8% was employed and flotation concentrate leach thickener overflow was used as a source of ferrous sulphate (approximately 30 g/L). A Sulphuric acid content of approximately 50 g/L was employed. The results as presented graphically in FIG. 4 indicate that the FILBLAST reactor can be employed for effective leaching of copper from concentrate which contains mainly chalcocite (51% Cu) and covellite. A final recovery of 97% could be achieved within a residence time of approximately 2 hours. During the leaching process, ferrous sulphate was oxidised to ferric state which in turn reacted with chalcocite and covellite to form copper sulphate and elemental sulphur. Spent ferric sulphate was continuously re-oxidised to ferric state resulting in an increasing ferric concentration in the solution from an initial value of approximately 1 g/L to approximately 20–30 g/L when copper sulphide dissolution approached completion. Such a final ferric concentration can be controlled at a lower level by appropriate control of oxygen injection.

EXAMPLE 4

Tests have also been conducted using a bornite filter cake sample with particle size P80=45 µm, taken from a flotation plant. The tests were conducted on 1000L of slurry in the temperature range of 85–90° C. A pulp density of approximately 8% was employed and a ferrous sulphate solution containing sulphuric acid was used as a source of ferrous sulphate (approximately 30 g/L). A Sulphuric acid content of approximately 50 g/L was employed. The results as presented graphically in FIG. 4 indicate that the FILBLAST reactor can be employed for effective leaching of copper from concentrate which contains mainly bornite and chalcopyrite (29.8% Cu). A final recovery of 95% could be achieved with a FILBLAST reactor operating time of approximately 4 hours followed by 2 hours of agitation without the FILBLAST reactor operating. During the leaching process, ferrous sulphate was oxidised to ferric state which in turn reacted with bornite and chalcopyrite to form copper sulphate and elemental sulphur. After 4 hours the FILBLAST reactor was turned off and the concentrate was allowed to react with the excess ferric sulphate.

A major advantage of the FILBLAST copper leaching process is that a high concentration of copper in the leach can be achieved particularly when leaching a high grade flotation concentrate. On the other hand because the copper concentration in the feed material is not a critical factor, as long as the gangue minerals do not interfere with the leaching process, the flotation concentration stage can be designed on the basis of high recovery instead of product grade. An overall high recovery would be quite probable.

Figure 5:
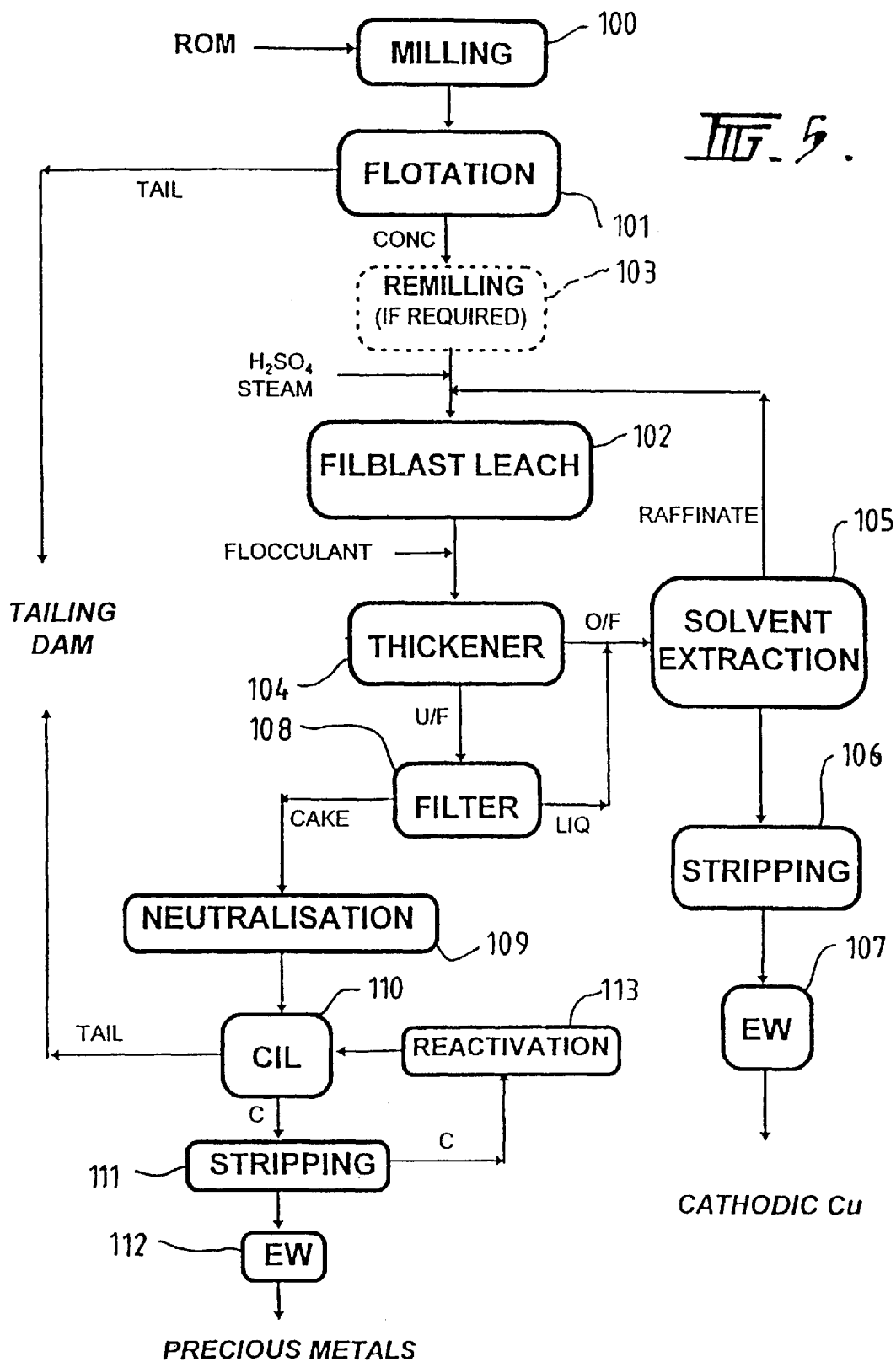

In FIG. 5 a preferred process for recovery of cathodic copper from sulphides is illustrated in flow sheet form. The recovery process incorporates a leaching step which utilises recirculation and oxidation of ferrous ion using a FILBLAST GSR similar to that described above. Following the steps of milling 100 and flotation 101, the copper flotation concentrate is subject to leaching 102 using a FILBLAST GSR for recirculation and oxidation of ferrous ion in the leach liquor. Sulphuric acid ($H_2SO_4$) is added to the slurry prior to leaching. Remilling 103 of the flotation concentrate may also be performed prior to leaching if required. A flocculant is added to the leached liquor as it is fed to thickener 104. Thickener overflow is subject to solvent extraction 105 and the mineral values obtained are subject to stripping 106 and electrowinning 107 to produce high grade cathodic copper. Raffinate from the solvent extraction stage 105 is returned to the leach circuit 102. Underflow from the thickener 104 is filtered 108 and the filter cake neutralised 109 prior to carbon in leach (CIL) processing 110. Carbon from the CIL process 110 is stripped 111 and any precious metals (gold, silver) are recovered by electrowinning 112. Stripped carbon is reactivated 113 and returned to the CIL process 110. The process illustrated in FIG. 5 is made feasible by the high concentration of copper that can be achieved in the FILBLAST leach 102.

From the above description of preferred embodiments of the process of ferrous oxidation and base metal/uranium leaching in accordance with the invention, it will be evident that the process has significant advantages compared to the prior art processes, including the following advantages:

(1) The process has a much shorter residence time of around a few hours that would be required for near complete base metal recovery, depending on the nature of the ore or concentrate, compared to at least several days for a bacterial oxidation process.

(2) Although the residence time is comparable to that of a conventional pressure oxidation (autoclave) process, applicant's process achieves equivalent ferrous oxidation and base metal/uranium dissolution without the application of pressure over the bulk volume of the ore/concentrate/tailings slurry or solution for the duration of the leaching process. Instead, the ore/concentrate/slurry or solution is preferably recirculated through a pressurised in-line mixer and discharged back to an unpressurised tank or reaction vessel. Hence, during leaching the slurry or solution spends much of the time in the unpressurised reaction vessel. Typically, during the leaching process each ore particle/unit solution volume passes through the higher pressure zone within the in-line mixer for less than a minute. That is, the present invention eliminates the need for an autoclave with its high capital cost. If desired autoclaves can still be used, but significantly, autoclave performance will be enhanced when used in embodiments of the present invention due to more efficient oxygen dissolution.

(3) Substantial savings both in capital investment and operating costs compared to bacterial leaching and pressure oxidation processes can be achieved.

(4) Substantial savings in chemical reagents are possible by continuously reoxidising the ferrous ions to the ferric state, as well as using low-cost oxygen as the oxidising agent.

Numerous variations and modifications to the process according to the invention will suggest themselves to persons skilled in the chemical engineering arts, in addition to those already described, without departing from the basic inventive concepts. For example, separate oxidation of ferrous solution prior to delivery to a leaching circuit may be preferable in some applications. All such variations and modifications are to be considered within the scope of the present invention, the nature of which is to be determined from the foregoing description.

I claim:

1. A process for oxidation of ferrous ions in solution, the process comprising:

forcing the ferrous ion-containing solution through an in-line mixer under the influence of a controlled pressure differential between an inlet and an outlet of the mixer; and injecting oxygen or an oxygen-containing chemical reagent directly into the in-line mixer to facilitate oxidation of said ferrous ions ($Fe^{2+}$) to form ferric ions ($Fe^{3+}$).

2. A process for oxidation of ferrous ions in solution as defined in claim 1, wherein the ferrous ion-containing solution is subjected to elevated pressures within the in-line mixer up to 1000 kPa.

3. A process for oxidation of ferrous ions in solution as defined in claim 1, wherein the ferrous ion-containing solution is subjected to high shear within the in-line mixer such that strong interphasic interaction between the oxygen or oxygen-containing chemical reagent and the ferrous ions is promoted.

4. A process for oxidation of ferrous ions in solution as defined in claim 1, wherein the ferrous ion-containing solution is subjected to elevated temperatures within the in-line mixer in the range 30–100° C.

5. A process for improved base metal and/or uranium leaching from ores, concentrates or tailings using ferric ions as an oxidising agent, the process comprising:
   dissolution of an insoluble base metal compound or uranium into a soluble metal compound in a leach slurry or solution by chemical oxidation with ferric ions ($Fe^{3+}$) so as to produce a byproduct ferrous ion ($Fe^{2+}$);
   recovering the base metal or uranium by extracting the soluble metal compound and subjecting it to a suitable winning process;
   recirculating the leach slurry or solution with the byproduct ferrous ion through an in-line mixer by forcing the leach slurry or solution through the in-line mixer under the influence of a controlled pressure differential between an inlet and an outlet of the mixer; and,
   converting the ferrous ion back to ferric ion by oxidation, wherein said oxidation is facilitated by injecting oxygen or an oxygen-containing chemical reagent directly into the in-line mixer.

6. A process for improved base metal and/or uranium leaching as defined in claim 5, wherein said in-line mixer is a static reactor operated so as to subject the leach slurry or solution to elevated pressures and/or high shear whilst injecting said oxygen or oxygen-containing chemical reagent.

7. A process for improved base metal and/or uranium leaching as defined in claim 5, wherein said step of dissolution includes adding an acid to the leach slurry or solution.

8. A process for improved base metal and/or uranium leaching as defined in claim 5, wherein said steps of dissolution and recovering the base metal or uranium are conducted simultaneously with said steps of recirculating and converting the ferrous to ferric ion.

9. A process for improved base metal and/or uranium leaching as defined in claim 5, wherein said steps of dissolution and recovering the base metal or uranium are conducted sequentially with said steps of recirculating and converting the ferrous to ferric ion.

10. A process for improved base metal and/or uranium leaching as defined in claim 5, wherein said base metal is copper and said step of dissolution includes adding sulphuric acid or hydrochloric acid to the leach slurry or solution.

11. A process for improved base metal and/or uranium leaching as defined in claim 10, wherein the acid content of the leach slurry or solution is maintained in the range 20 to 50 g/L.

12. A process for improved base metal and/or uranium leaching as defined in claim 10, wherein the temperature of the leach slurry or solution is maintained at elevated temperatures within the range 30–100° C.

13. A process for improved base metal and/or uranium leaching as defined in claim 10, wherein said step of dissolution includes adding ferric or ferrous ions to the leach slurry or solution.

14. A process for improved base metal and/or uranium leaching as defined in claim 13, wherein the ferric or ferrous ions are added in any one or more of the following forms:
   (i) ferrous or ferric sulphate in either a hydrated or non-hydrated state;
   (ii) ferrous or ferric chloride in either a hydrated or non-hydrated state;
   (iii) iron sulphides which are present in copper sulphide ores or concentrates;
   (iv) metallic iron which dissolves in acid to form ferrous and/or ferric ions; and,
   (v) any other iron containing chemical compounds or minerals that release ferrous or ferric ions in the leach slurry or solution.

15. A process for improved base metal and/or uranium leaching as defined in claim 10, wherein the ferrous ($Fe^{2+}$) ion content of the leach slurry or solution is in the range of approximately 20 to 50 g/L for complete dissolution of copper sulphides.

16. A process for improved base metal and/or uranium leaching as defined in claim 5, wherein said steps of dissolution, recirculating and converting are conducted over multiple stages in a cascade arrangement so as to maximise oxygen utilisation and minimise short circuiting.

17. A process for improved base metal and/or uranium leaching as defined in claim 5, wherein said leach slurry or solution containing the insoluble base metal or uranium is obtained from a heap leaching process in which a heap of ore is subjected to leaching by a reticulation system.

* * * * *